United States Patent [19]

Kleinwächter et al.

[11] Patent Number: 5,256,188

[45] Date of Patent: Oct. 26, 1993

[54] PROCESS FOR THE SEPARATION OF RHODIUM FROM ORGANIC SOLUTIONS

[75] Inventors: Ingo Kleinwächter, Hanau; Karlheinz Kleiss, Linsengericht; Roland Gerner, Rodenbach, all of Fed. Rep. of Germany

[73] Assignee: Degussa Aktiengesellschaft, Frankfurt am Main, Fed. Rep. of Germany

[21] Appl. No.: 939,934

[22] Filed: Sep. 2, 1992

[30] Foreign Application Priority Data

Jan. 15, 1992 [DE] Fed. Rep. of Germany ....... 4200844

[51] Int. Cl.$^5$ ............................................. C22B 3/46
[52] U.S. Cl. ................................ 75/722; 75/732; 75/741
[58] Field of Search .................... 75/722, 732, 741

[56] References Cited

U.S. PATENT DOCUMENTS 3,545,963 12/1970 Wakamatsu et al. .
4,273,578 6/1981 Nesvadba et al. .................. 75/741
4,687,514 8/1987 Renner et al. .

FOREIGN PATENT DOCUMENTS 1558395 3/1970 European Pat. Off. .
3223501 11/1983 European Pat. Off. .
270423 11/1988 Japan ................................. 75/732

*Primary Examiner*—Melvyn J. Andrews
*Attorney, Agent, or Firm*—Beveridge DeGrandi, Weilacher & Young

[57] ABSTRACT

A process for the separation of rhodium from rhodium containing organic solutions, organic-aqueous mixtures or aqueous solutions containing complexing agents is disclosed. Metallic bismuth, bismuth oxide, bismuth hydroxide or another reducible bismuth compound is added to 50° to 250° C. as a precipitating agent, optionally with a reducing agent, and the precipitate is separated. The corresponding antimony compounds can also be used in place of bismuth.

7 Claims, No Drawings

PROCESS FOR THE SEPARATION OF RHODIUM FROM ORGANIC SOLUTIONS

BACKGROUND AND INTRODUCTION

The present invention relates to a process for the separation of rhodium from rhodium containing solutions including organic solutions, organic-aqueous mixtures, and aqueous solutions containing organic complexing compounds, by precipitation at elevated temperatures.

Aqueous and non-aqueous rhodium containing solutions are produced in many sectors of industry and the rhodium has to be recovered from these solutions while accompanying substances, such as salts or organic compounds of low volatility, are separated out to the greatest possible extent. Such solutions are especially residues from homogenous rhodium catalysis reactions, spent solutions from electroplating, or mother liquors from the production of organorhodium compounds. Recovery of the rhodium from these waste solutions as quantitatively as possible often plays a large part in the viability of the processes carried out with the rhodium. Problems with the quantitative recovery of rhodium from waste solutions always arise when the rhodium is in an organic or organic-aqueous solution or is held in aqueous solution by strong complexing agents.

The best-known process for the recovery of rhodium from recycling materials or from primary production concentrates is separation by a wet chemical method. This is done by converting the material to an aqueous solution acidified with hydrochloric acid, from which the rhodium is separated out as ammonium hexachlororhodate by precipitation, optionally after the other noble metals have been separated out. The rhodium residues remaining in solution after the ammonium precipitation are separated out by reduction or cementation. This process has the disadvantage that all the material must be converted to an aqueous solution acidified with hydrochloric acid, and that the separation of the rhodium is not quantitative, particularly when comparatively large proportions of base metal or semi-metal salts are present. When other reducible metals are simultaneously present, selective separation of the rhodium residues by cementation is impossible. If the aqueous solution acidified with hydrochloric acid contains other strongly complexing components, neither ammonium precipitation nor cementation can be carried out quantitatively. Organic rhodium solutions or organic-aqueous solutions cannot be recovered by this process.

If the rhodium solutions contain impurities such as base metal salts, neutral salts, complexing agents, or high-boiling organic compounds, a useful method of recovery can be to subject the waste solutions containing noble metal to a metallurgical procedure. However, these processes are generally expensive and cannot recover the rhodium quantitatively. Also, there is only a limited possibility of processing comparatively large quantities of combustible organic compounds via metallurgical processes.

Another possible way of treating combustible waste containing rhodium is first to burn off the organic matrix and then to recover the rhodium from the remaining ash. The disadvantages of this process are atmospheric pollution, the residues of undesirable elements in the ash, and the rhodium losses on combustion.

German patent No. 32 23 501 describes a process in which the noble metals are precipitated from aqueous and non-aqueous solutions by reaction with tellurium or reducible tellurium compounds and recovered from the precipitate. This process has the disadvantage that it is not generally applicable to all rhodium-containing materials, that tellurium occasionally passes into the solvent in relatively large quantities which interfere with further processing, and that, in the reaction, readily volatile and strong-smelling tellurium compounds can be formed which make handling more difficult, degrade the environment, and may be toxic. The tellurium/rhodium concentrate obtained in the treatment of rhodium-containing organic materials by this process must be freed from the adhering organic materials by combustion before the recovery of the rhodium. The tellurium dioxide thereby formed is volatile and not only represents tellurium losses but also gives rise to problems with the waste-gas treatment.

SUMMARY OF THE INVENTION

An object of the present invention was therefore to find a process for the separation of rhodium from a wide variety of rhodium containing solutions including organic solutions, organic-aqueous mixtures, and aqueous solutions containing complexing compounds, by precipitation at elevated temperatures, which is easy to carry out and generally applicable and which produces a high yield of noble metal, without creating difficulties with the recovery of the concentrates and the other reaction products.

According to the present invention, this and other objects are achieved by using, as the precipitating agent, metallic bismuth, bismuth oxide, bismuth hydroxide, other reducible bismuth compounds, metallic antimony, antimony oxide, antimony hydroxide or other reducible antimony compounds, optionally together with a reducing agent, and by carrying out the precipitation at 50° to 250° C. The precipitation is preferably carried out at 150° to 200° C. If low-boiling solvents are involved, the precipitation must be carried out in a pressure vessel. Reducible bismuth compounds and reducible antimony compounds suitable for this invention will be apparent to those skilled in the art from the disclosure herein. Generally, they are those compounds that are reducible under the conditions employed herein.

The precipitation is advantageously carried out with bismuth oxide or bismuth hydroxide.

DETAILED DESCRIPTION OF THE INVENTION

If the original organic or aqueous rhodium solution is not sufficiently reducing, a reducing agent, such as ascorbic acid, formic acid or an aqueous solution of sodium sulphite, is added. Aqueous solutions are preferably acidified slightly with sulfuric acid or acetic acid.

Surprisingly, a suitable precipitating agent is finely divided bismuth or antimony, which is added to the solutions or produced in the solution by the reduction of bismuth or antimony compounds. This process makes it possible to achieve a quantitative recovery of rhodium even from solutions from which rhodium cannot be separated out quantitatively by the conventional precipitation and cementation processes because it is in complexed form or in organic or organic-aqueous solution. Compared with the known processes, precipitation with bismuth (or antimony) or bismuth compounds (or antimony compounds) is distinguished by being easy to carry out, by producing a high yield, and by being generally applicable. Problems such as reaction by-products which are unpleasant, interfere with the further working-up or handling of the products and residual materials or are toxic or environmentally unacceptable do not arise when carrying out the process with bismuth or bismuth compounds. As antimony oxide is classified as a carcinogenic working substance, it is preferable to work with bismuth from the point of view of the environmental acceptability of the process.

The bismuth (or antimony)/rhodium precipitates formed can be recovered in a known manner, it being possible for both the rhodium and the bismuth (or antimony) to be recovered quantitatively. The bismuth (or antimony) used is not taken up by organic waste solutions, so these can safely be burnt after separation of the rhodium. The precipitates from organic solutions can also be burnt without problems in order to remove the adhering organic materials, since bismuth (or antimony) does not form readily volatile oxides.

The process according to the present invention can be applied both to aqueous rhodium solutions, which can also contain base metal cations, and anions such as halides, cyanides, sulphates, thiosulfates or phosphates, and to organic solutions and aqueous-organic mixtures, which can contain e.g. alcohols, aldehydes, organic acids, hydrocarbons or organophosphorus and organosulfur compounds as well as halogenated organic compounds.

The quantity of precipitating agent added (as a compound or the element) depends on the rhodium content and the quantity of solution and can be determined by simple experiments, as can also the appropriate reaction temperature and time and addition of reducing agent. Hence the quantity is that amount which is sufficient to precipitate the rhodium present in the solution to be treated. The reaction conditions are not narrowly critical and can readily be determined by persons skilled in the art in a routine manner.

The following Examples will illustrate the process according to the invention in greater detail:

EXAMPLES 1. 300 ml of an organic residue obtained from the well known oxo synthesis, containing 750 ppm of rhodium, are stirred with 5 g of bismuth oxide for 4 h at 200° C. The precipitate is filtered off and the rhodium is recovered. The filtrate contains <5 ppm of rhodium; bismuth is not detectable.

2. 300 ml of an aqueous residue from homogenous catalysis, containing 2400 ppm of rhodium, organic salts and complexing agents, are adjusted to approximately pH 2 with sulfuric acid and refluxed with 5 g of bismuth oxide for 12 h. The precipitate is filtered off and the rhodium is recovered. The filtrate contains <5 ppm of rhodium.

3. 300 ml of an organic residue from the oxo synthesis, containing 750 ppm of rhodium, are stirred with 10 g of finely divided bismuth for 12 h at 200° C. The precipitate is filtered off and the rhodium is recovered. The filtrate contains <5 ppm of rhodium; bismuth is not detectable.

4. 300 ml of an aqueous rhodium mother liquor from the production of organorhodium compounds, containing 200 ppm of rhodium and also containing—in addition to water—acetylacetone, ethanol and dimethylformamide, are adjusted to pH 2 with sulfuric acid and stirred with 5 g of bismuth oxide in a autoclave for 12 h at 150° C. The precipitate is filtered off and the rhodium is recovered. The filtrate contains <5 ppm of rhodium.

5. 300 ml of an organic residue from the oxo synthesis, containing 750 ppm of rhodium, are stirred with 5 g of antimony oxide for 4 h at 200° C. The precipitate is filtered off and the rhodium is recovered. The filtrate contains <5 ppm of rhodium; antimony is not detectable.

The foregoing examples show that rhodium containing solutions obtained from a variety of different sources, the precise composition of which is not important for purposes of the invention, can be treated to recover the rhodium. Therefor, for purposes of illustrating the invention, it is unnecessary to provide details of the nature of the organic residue.

Further variations and modifications of the foregoing will be apparent to those skilled in the art and such variations and modifications are attended to be encompassed by the claims that are appended hereto.

What is claimed:

1. A process for the separation of rhodium from rhodium containing organic solutions, organic-aqueous mixtures and aqueous solutions containing organic complexing compounds, by precipitation at elevated temperatures, said process comprising adding a precipitating agent selected from the group consisting of metallic bismuth, bismuth oxide, bismuth hydroxide, other bismuth compounds reducible to bismuth, metallic antimony, antimony oxide, antimony hydroxide, and other antimony compounds reducible to antimony, and optionally a reducing agent, to said organic solutions, organic-aqueous mixtures and aqueous solutions containing organic complexing compounds, at a temperature of 50° to 250° C., precipitating said rhodium and recovering said rhodium.

2. The process according to claim 1, wherein said temperature is 150° to 200° C.

3. The process according to claim 1, wherein said reducing agent is ascorbic acid, formic acid or an aqueous solution of sodium sulfite.

4. The process according to claim 1, wherein said aqueous solution is acidified with sulfuric acid or acetic acid.

5. The process according to claim 1, wherein said precipitating agent is bismuth oxide or bismuth hydroxide.

6. The process according to claim 1, wherein said precipitating agent is metallic bismuth, bismuth oxide, bismuth hydroxide, metallic antimony, antimony oxide, or antimony hydroxide.

7. A process for the separation of rhodium from rhodium containing organic solutions, organic-aqueous mixtures and aqueous solutions containing organic complexing compounds, by precipitation at elevated temperatures, said process comprising adding a precipitating agent which is bismuth metal or antimony metal to said organic solutions, organic-aqueous mixtures and aqueous solutions containing organic complexing compounds, or adding a precipitating agent which is a compound which is reduced to form bismuth metal or antimony metal in said organic solutions, organic-aqueous mixtures and aqueous solutions containing organic complexing compounds, and also optionally adding a reducing agent, at a temperature of 50° to 250° C., precipitating said rhodium and recovering said rhodium.

* * * * *